United States Patent
Lanser et al.

(10) Patent No.: US 6,296,470 B1
(45) Date of Patent: Oct. 2, 2001

(54) HEAT STAKING HEAD WITH RADIANT HEAT SOURCE

(76) Inventors: Mark Lanser, 9150 E. 50 Rd., Cadillac, MI (US) 49601; Roger Miller, 3416 Hollywood Dr., Holland, MI (US) 49424; Andrew Van Klompenberg, 4473 Sugarbush Ct., Grandville, MI (US) 49418

( * ) Notice: Subject to any disclaimer, the term of this patent is extended or adjusted under 35 U.S.C. 154(b) by 0 days.

(21) Appl. No.: 09/531,543

(22) Filed: Mar. 20, 2000

(51) Int. Cl.[7] ............... B29C 65/14; B29C 65/64
(52) U.S. Cl. ............ 425/508; 264/249; 264/481; 425/112; 425/174.4; 425/392
(58) Field of Search ............... 264/249, 481, 264/492; 29/243.5, 509; 425/112, 384, 174.4, 392, 508

(56) References Cited

U.S. PATENT DOCUMENTS

| | | | |
|---|---|---|---|
| 3,452,376 | * 7/1969 | Ito ........................... | 29/509 |
| 4,510,005 | * 4/1985 | Nijman ..................... | 425/392 |
| 4,767,298 | 8/1988 | Bocchicchio et al. ..... | 425/112 |
| 5,018,957 | 5/1991 | Assink et al. ............. | 425/112 |
| 5,227,173 | 7/1993 | Sherwood ................. | 425/384 |
| 6,099,291 | * 8/2000 | Lanser ....................... | 425/508 |

OTHER PUBLICATIONS

Derwent Abstract of Research disclosure RD–419047A, Mar. 10, 1999.*

* cited by examiner

Primary Examiner—Robert Davis
(74) Attorney, Agent, or Firm—Young & Basile

(57) ABSTRACT

A head for use in a heat staking machine utilizes an infrared heat lamp and reflectors to direct radiant energy onto a plastic stud to heat and so soften it prior to the staking punch impacting the stud. The lamp is disposed within a parabolic primary reflector which directs the lamp's output toward a secondary reflector. The secondary reflector has is concave and has a central aperture at its vertex through which the stud projects such that all of the radiant energy emitted by the lamp is focussed radially inward onto the stud. The punch is slidably mounted to the primary reflector for reciprocal movement along the axes of the reflectors, and is extended to impact the stud.

11 Claims, 6 Drawing Sheets

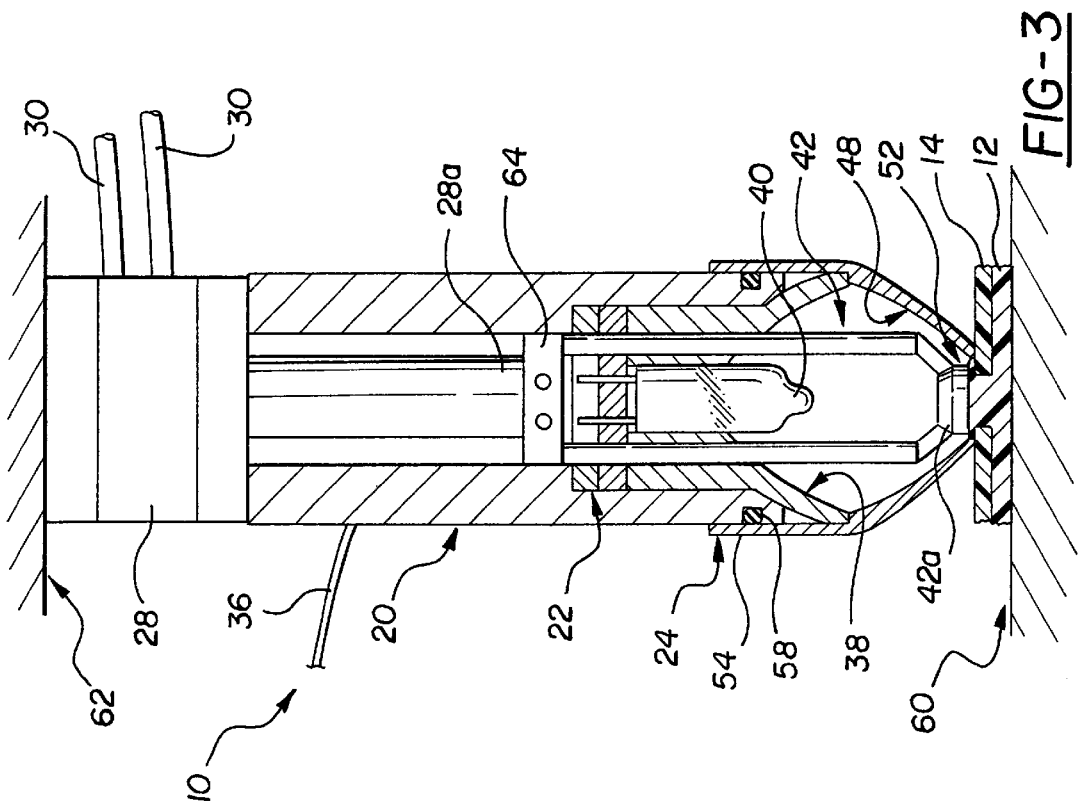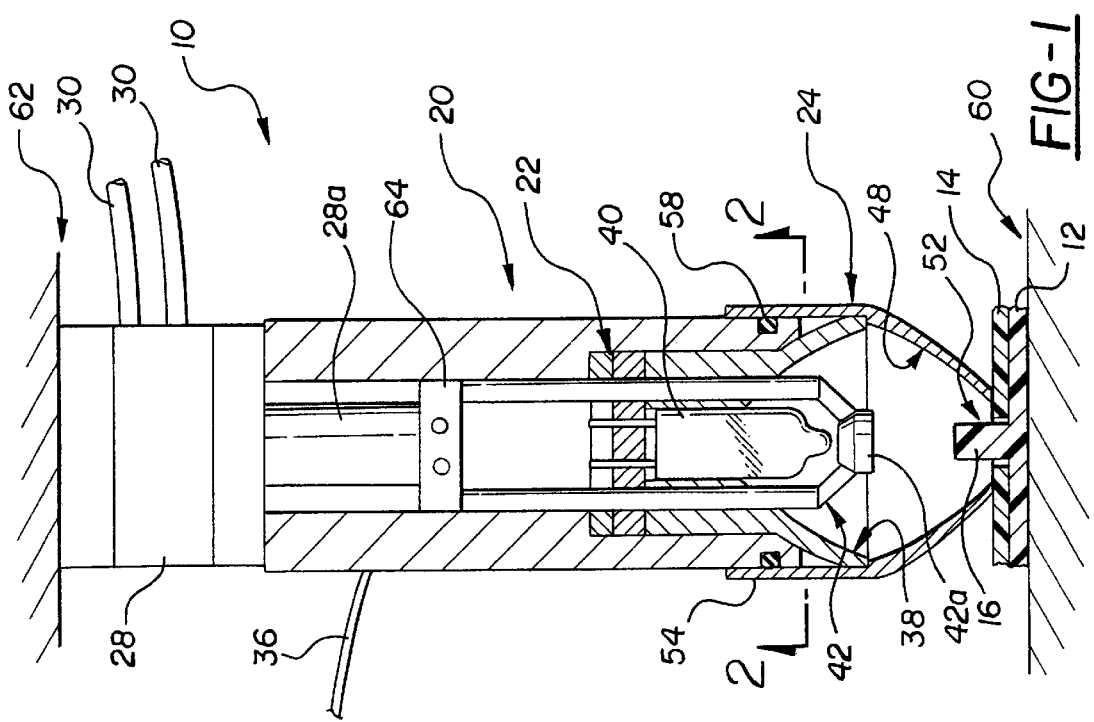

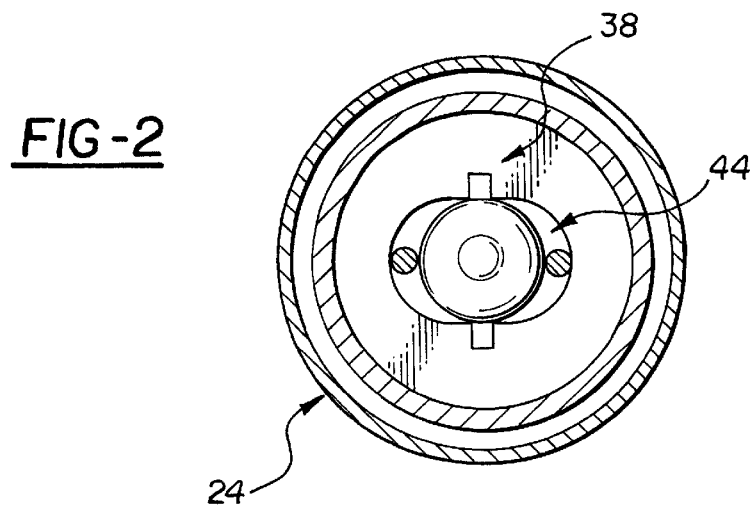
FIG-2
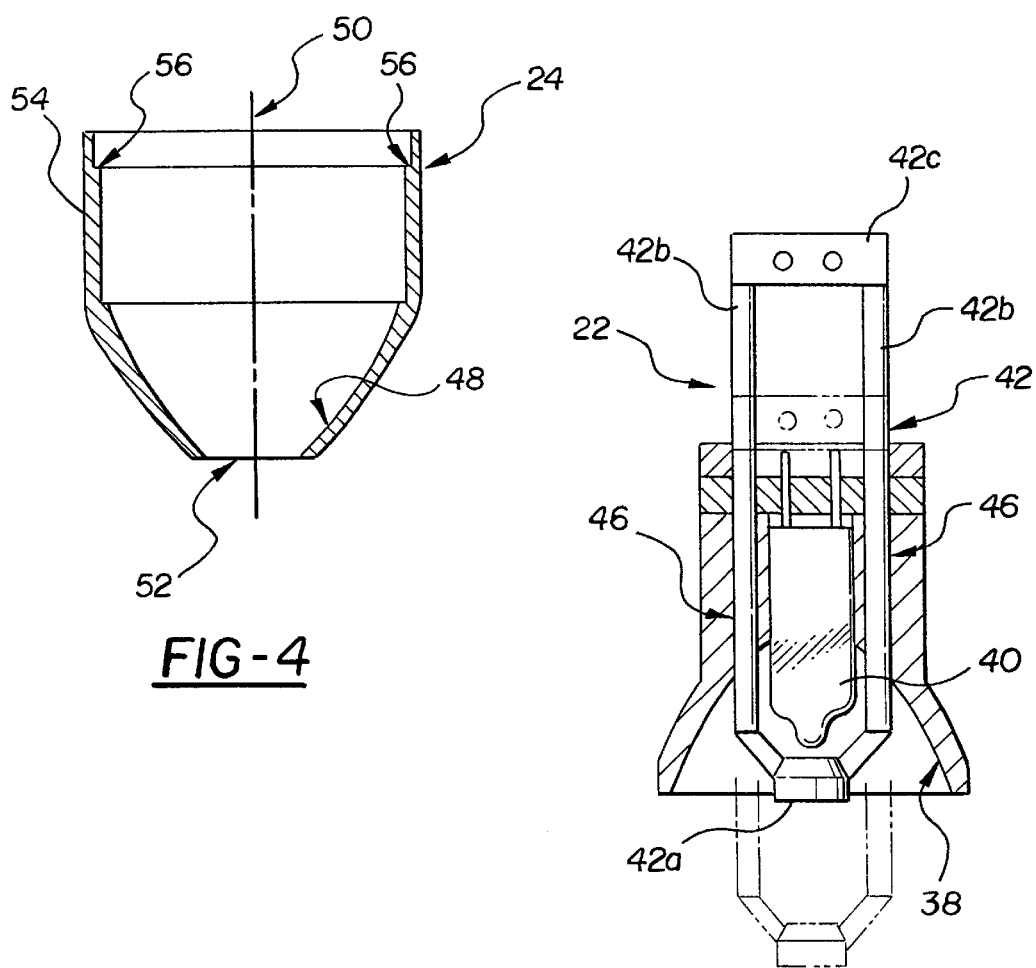
FIG-4
FIG-5

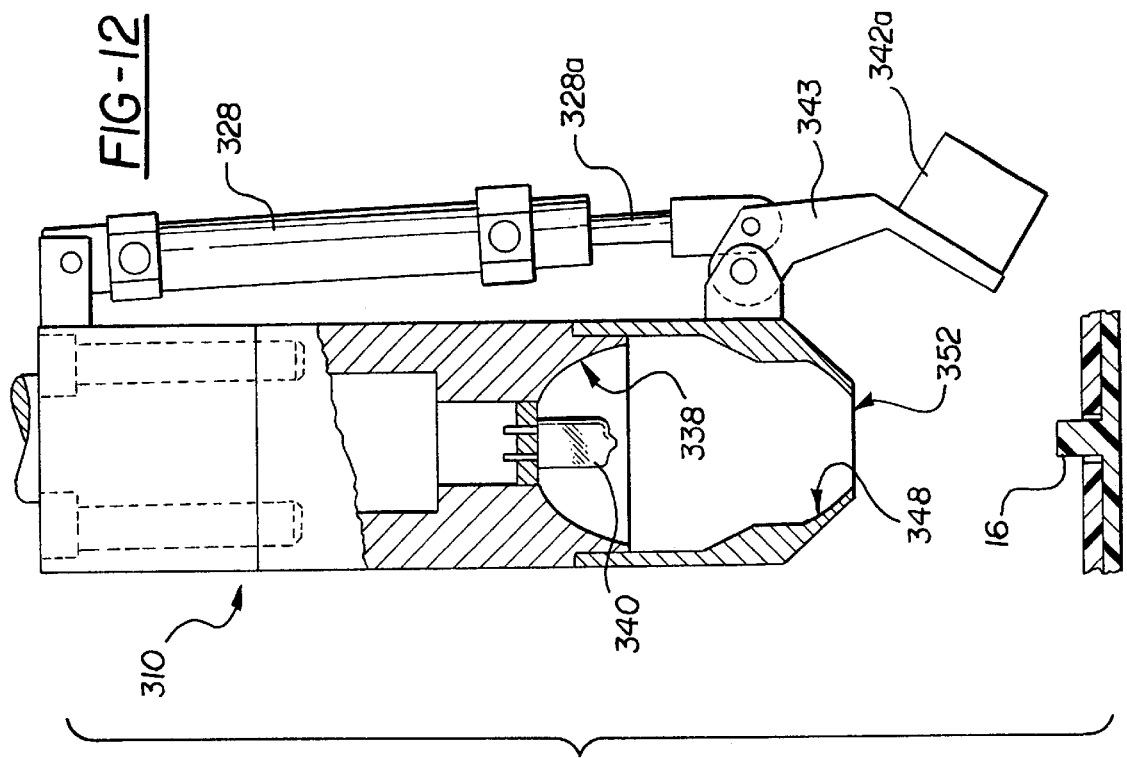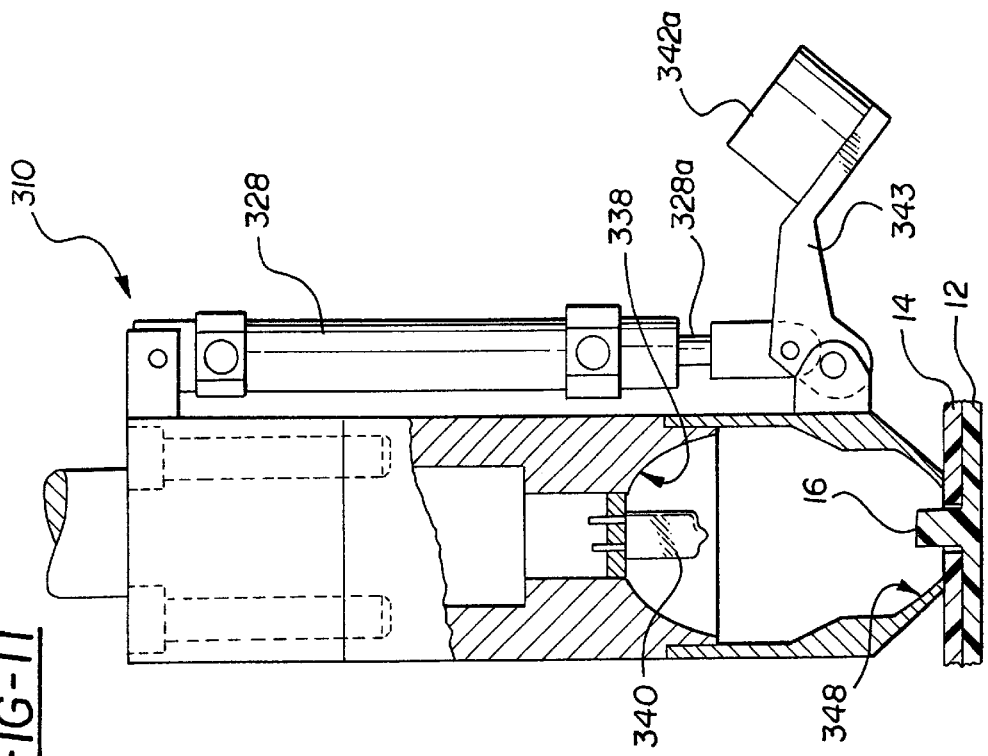

HEAT STAKING HEAD WITH RADIANT HEAT SOURCE

FIELD OF THE INVENTION

The present invention relates to heat staking machines for joining parts together, and more particularly to a head for use on such a machine and having a radiant heat source to heat and thereby soften the part to be deformed.

BACKGROUND OF THE INVENTION

Heat staking is a process for permanently joining first and second parts at one or more discrete points. One of the parts to be joined includes a short plastic post or stud which is inserted through a hole or aperture of roughly equivalent size in other part. The plastic stud is then heated until it is plastically deformable and the end of the stud is flattened with a metal punch to form a rivet-like head which locks the two parts together.

It is possible to accomplish the heating and the flattening of the stud simultaneously by heating the punch prior to bringing into contact with the stud, the punch transferring its heat to the stud to soften it is being shaped. In such an operation, the punch is typically resistance heated by applying electrical current to the punch. Heat staking machines operating in this manner are disclosed in U.S. Pat. Nos. 4,767,298 and 5,227,173.

Another known heat staking technique is to heat the stud prior to it being contacted by the punch. In the past, this has been achieved by blowing hot air over the stud. U.S. Pat. No. 5,018,957 discloses a staking machine using electric heaters to generate the hot air and blowers to circulate the hot air over the stud. In some manufacturing operations, this pre-impact heating of the stud has been found to be advantageous in that it minimizes the amount of residual stress in the deformed stud after it has cooled. In the past, however, the apparatus necessary for the heating and circulation of air has resulted in a relatively large and mechanically complicated machine. Also, such a machine is relatively energy inefficient in that a large percentage of the heat generated to is not transferred to the stud but rather is wasted.

It is therefore desirable to provide a heat staking machine that is energy efficient and that is simple and compact in construction.

SUMMARY OF THE INVENTION

In accordance with the present invention, an improved heat staking head for use in a staking machine utilizes a radiant heat source and primary and secondary reflectors which combine to focus radiant energy onto the plastic stud to heat and soften stud prior to the staking punch impacting the stud.

In a first embodiment of the invention, the source of radiant energy is an infrared heat lamp mounted directly above and in coaxial alignment with the staking punch such that the lamp points downward toward the plastic stud. A generally parabolic primary reflector surrounds the lamp, and a punch is mounted for sliding movement along the axis of thereof. A secondary reflector has a central aperture at its vertex through which the stud projects, the reflector directing substantially all of the radiant energy emitted by the lamp radially inward onto the stud. When the stud has been sufficiently heated and softened, the punch is driven downwardly to impact and deform the stud. This provides a compact, mechanically simple and highly energy efficient staking apparatus.

In a second embodiment, multiple radiant energy sources are used, each with its own primary reflector. A single secondary reflector serves both primary reflectors.

In a still further embodiment a punch-head is disposed on a pivotal arm so as to be moveable in and out of an operative position relative to the heat source and the work piece.

BRIEF DESCRIPTION OF THE DRAWINGS

FIG. 1 is a side elevation view of a staking head according to a first embodiment of the invention with a staking punch in a retracted position;

FIG. 2 is a cross-sectional view taken along line 2—2 of FIG. 1;

FIG. 3 is a side-elevation of the heat staking head of FIG. 1 with the staking punch in the extended position to contact a workpiece;

FIG. 4 is a side elevation view of a secondary reflector of the heat staking head of FIGS. 1–3;

FIG. 5 is a view of the primary reflector/punch assembly of the heat staking head of FIGS. 1–3;

FIG. 11 is a side view of another embodiment of the present invention during the stud heating cycle;

FIG. 12 is a side view of the heat staking head of FIG. 11 in a raised position.

DESCRIPTION OF THE PREFERRED EMBODIMENTS

Figure 13:
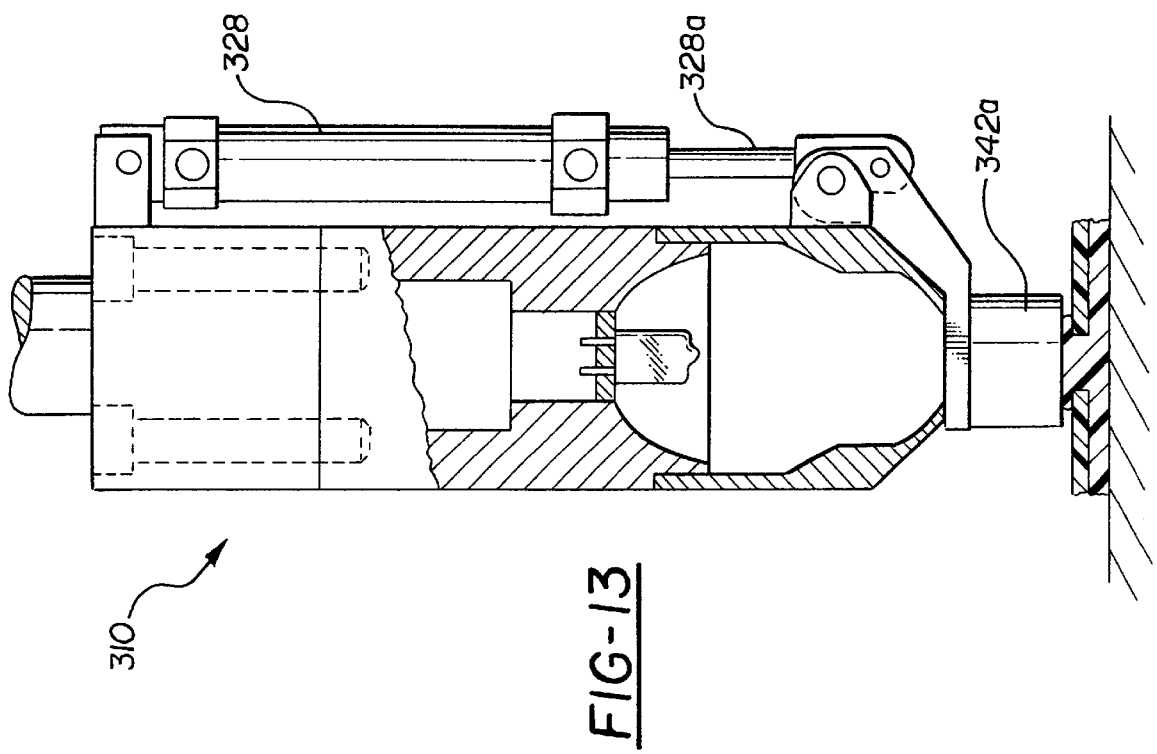
FIG. 13 is a side view of the heat staking apparatus of FIGS. 11–12 during the staking stroke.

Referring now to FIGS. 1–3, a heat staking head 10 according to the present invention is shown positioned above first and a second workpieces 12,14 which are to be joined. As is well known in the heat staking art, a stud 16 formed of a thermoplastic material, such as ABS plastic, projects upwardly from first workpiece 12 and passes through a hole 18 formed in the second workpiece 14. Stud 16 is flatted utilizing heat staking head 10 in the manner to be described below to fasten first and second workpieces together.

As seen in FIGS. 1–6, heat staking head comprises a body portion 20, a primary reflector/punch assembly 22 retained within the body portion, and an end cap 24 which is secured to the lower end of the body portion to maintain the primary reflector/punch assembly therein.

Figure 6:
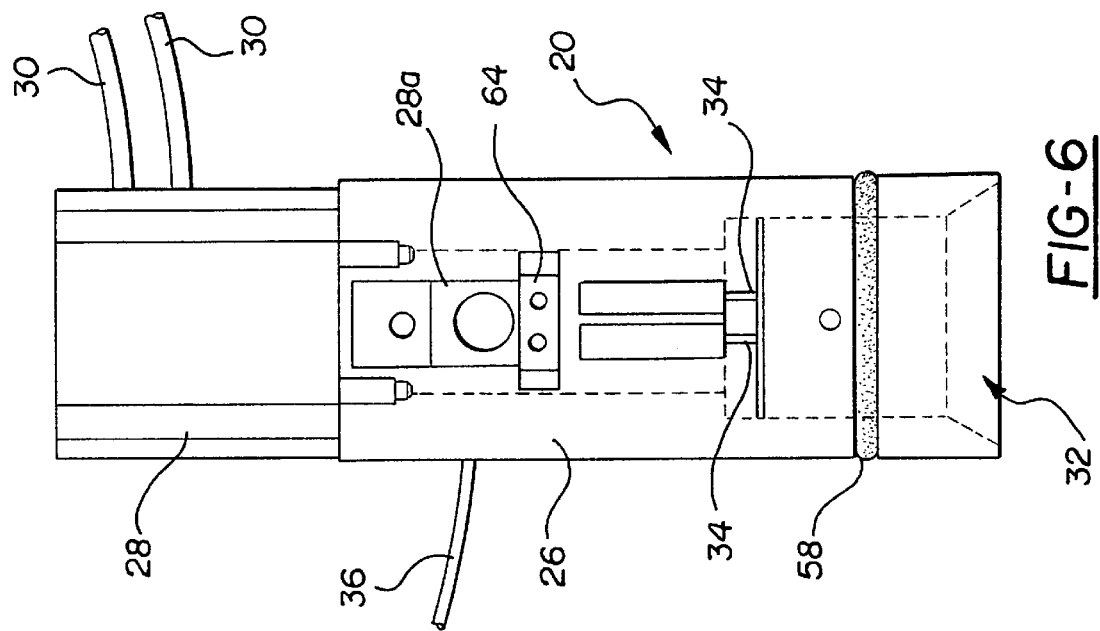
FIG. 6 is a view of the body assembly portion of the heat staking head of FIGS. 1–3.

As best seen in FIG. 6, body portion 20 comprises a generally cylindrical housing 26, an air cylinder 28 mounted to an upper end of the housing and supplied with air pressure through hoses 30, a hollow receptacle 32 at a lower end of the housing, and electrical connectors 34 at an upper end of the receptacle 32. Electrical power is supplied to connectors 34 through a power cord 36.

As best seen in FIG. 5, primary reflector/punch assembly 22 comprises a generally parabolic primary reflector 38, a radiant heat source such as an infrared lamp 40 located within the primary reflector at the approximate focal point thereof, and a punch 42 mounted to the primary reflector for vertical sliding movement between the retracted position shown in solid lines in FIG. 5 and the extended position shown in phantom lines. Lamp 40 projects through an oblong or elliptical opening 44 at the vertex of primary reflector 38 (see FIG. 2).

Punch 42 has a generally circular head 42a at its lower end and a pair of legs 42b extend upwardly from the head, passing on either side of the lamp 40 and received by slide guides 46 formed in primary reflector 38. The lower surface of punch head 42a is shaped as desired to form the stud after deformation. A butt plate 42c connects the two legs at their upper ends. Punch 42 is metal, preferably having a reflective surface finish.

End cap 24 is circular when viewed from above and is hollow. The lower end of end cap 24 comprises a secondary reflector 48 having a concave inner surface oriented to face upwardly. The inner surface is a surface of revolution having an axis of symmetry 50 oriented vertically as shown in FIGS. 1–4. A central aperture 52 in formed at the vertex of secondary reflector 48 and is sized to allow stud 16 to protrude upwardly therethrough as seen in FIG. 1. A cylindrical rim 54 extends upwardly from secondary reflector 48 and has an annular shoulder 56 immediately adjacent the upper edge of secondary reflector 48.

To assemble heat staking head 10 from the three components shown if FIGS. 4–6, primary reflector/punch assembly 22 is inserted upwardly into receptacle 32 in the bottom of body portion 20 so that lamp 40 makes contact with electrical connectors 34 and punch butt plate 42c contacts a drive piston 28a of air cylinder 28. End cap 24 is then fitted over the lower end of body portion 20 such that the outer rim of primary reflector 38 is seated on shoulder 56. End cap 24 and body portion 20 may be secured together by a friction fit with a detent at the fully seated position, or rim 54 of the end cap 24 may have female threads formed on its inner circumference which mate with male threads formed on the lower end of the body portion 20. An O-ring 58 may be provided around body portion 20 to achieve a moisture-tight seal with end cap 24.

As seen in FIG. 1, workpieces 12, 14 are supported on top of a lower platen 60 of a staking machine, and heat staking head 10 is attached to an upper platen 62 of the staking machine. Upper and lower platens 60,62 are vertically movable relative to one another so that heat staking head 10 is movable between a lowered position wherein stud 16 projects through aperture 52 in end cap 24 (as shown in FIGS. 1 and 3) and a raised position (not shown) wherein the stud is withdrawn from the aperture 52.

In operation, a staking cycle begin when the workpieces are positioned directly below heat staking head 10 and the head moved to the lowered position shown in FIG. 1. Lamp 40 is energized and the radiation emitted thereby is directed downwardly by primary reflector 38, collected by the concave inner surface of secondary reflector 48, and focussed radially inward onto the stud 16. Lamp 40 is energized for a length of time sufficient to heat stud 16 to a temperature at which it is plastically deformable. The required heating time depends upon the power output of lamp 40 and the type and color of the plastic being heated. Using a 35 watt lamp 40 and white ABS plastic, for example, it has been found that it takes approximately 15 seconds to the heat the stud 16 to 350–400° F., the temperature at which it may easily be formed. Darker colored plastic will heat up more quickly.

Once stud 16 is sufficiently softened, lamp 40 is de-energized and air cylinder 28 is actuated so that drive piston 28a is extended to drive punch 42 downwardly, urging head 42a into contact with the stud 16 and flattening the stud as seen in FIG. 2. Punch 42 preferably has a highly reflective surface finish so that it remains relatively cool. Accordingly, contact between punch head 42a and stud 16 causes the stud to quickly cool and resolidify so that it retains its deformed shape when air cylinder drive piston 28a is retracted and punch 42 returns to its raised position.

Air cylinder piston 28a preferably has a magnet 64 at its lower end which magnetically engages the butt plate 42c of punch 42 so that when the piston 28a returns to the retracted position it carries the punch 42 along with it. This magnetic connection provides for superior field servicing of the heat staking head 10, as there is no mechanical connection which must be disconnected before disassembling the heat staking head 10. Alternatively, a spring (not shown) may be provided to return punch 42 to the retracted position when air cylinder piston 28a is withdrawn.

Rather than completely de-energizing lamp 40 prior to actuation of the air cylinder 28, it may be advantageous instead to reduce the electrical voltage supplied to the lamp 40 to a low level. This keeps the lamp 40 filament somewhat warm between heating cycles so that the lamp 40 can quickly return to the desired operating temperature when full power is reapplied.

It should be noted that lamp 40, primary reflector 38, and secondary reflector 48 are oriented so that nearly all of the output of the lamp 40 is collected by the secondary reflector 48 and is concentrated onto the stud 16. Accordingly, there is very little undesirable and wasteful heating of the structure of heat staking head 10 or the surface of the first workpiece 12 surrounding the stud 16.

The concave inner surfaces of the primary reflector 38 and secondary reflector 48 are highly reflective of the wavelengths of infrared radiation emitted by lamp 40. It has been found that a polished aluminum or stainless steel surface has desirable reflective properties. Secondary reflector 48 may be machined from a billet of aluminum or stainless steel, with the complex shape of the concave inner surface being formed by a computer numerically controlled milling machine.

After punch 42 is returned to the retracted position, workpieces 12,14 are lowered relative to the staking head 10 (this may be achieved by raising upper platen or by lowering lower platen) to withdraw stud 16 from central aperture 52, and another pair of workpieces to be joined are placed in the position shown in FIG. 1. The heat/punch staking cycle is then repeated. Although FIGS. 1–3 depict a single staking head 10, it is well known in the art to construct heat staking machines having a plurality of staking heads which are driven simultaneously, sometimes by a single air cylinder, so that multiple heat staked joints may be formed with a single stroke of the machine.

Rather than using a true parabolic primary reflector which is designed to direct its rays parallel to its central axis, it is possible to use a primary reflector having a convergent design. This type of reflector directs its rays inwardly toward a focal point, and this allows the secondary reflector 48 to be of smaller outer diameter than the primary reflector while still capturing all of the output of lamp 40.

Figure 7:
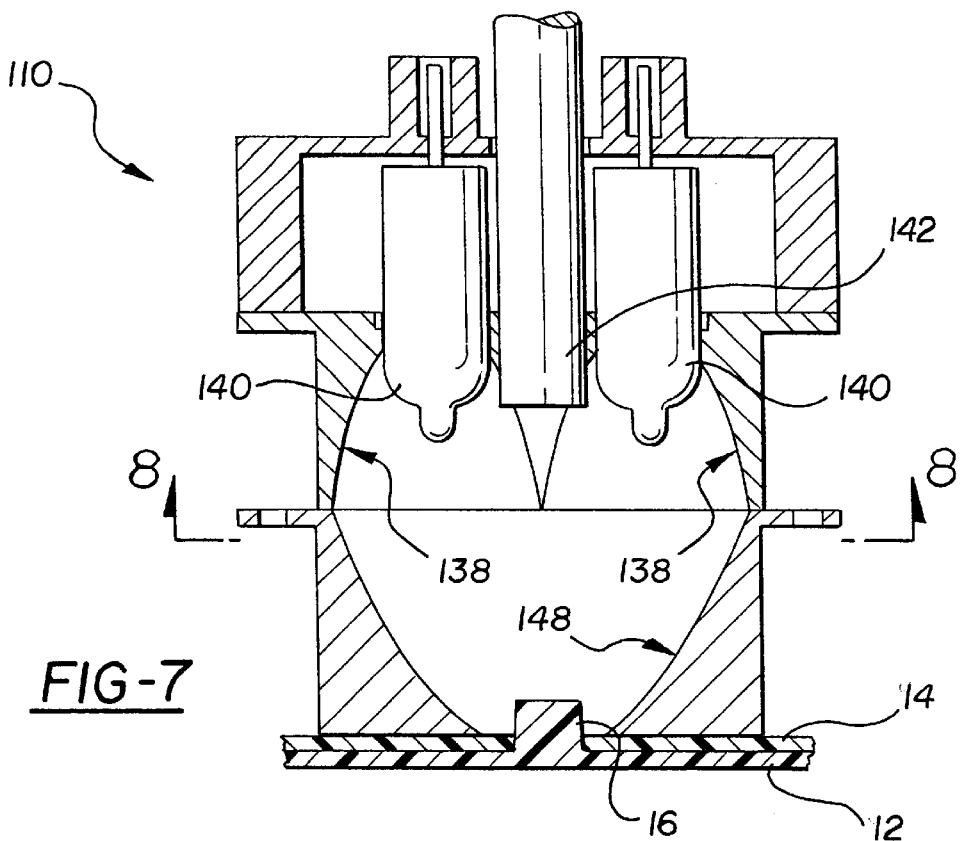
FIG. 7 is a partial side view of a second embodiment of a heat staking head according to the present invention.
Figure 8:
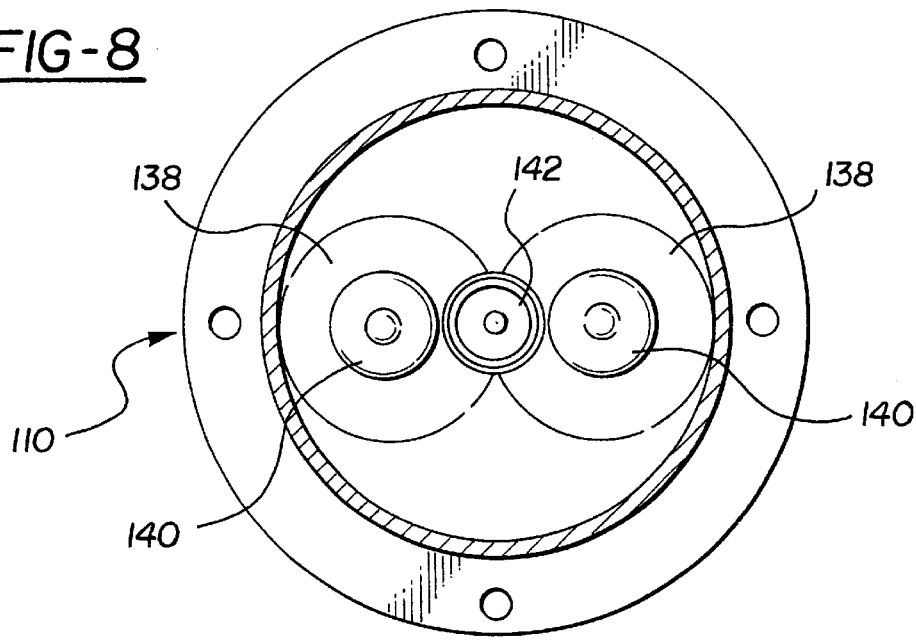
FIG. 8 is a cross-section view taken along line 8—8 of FIG. 7.

In another embodiment of the invention shown in FIGS. 7 and 8, a heat staking head 110 comprises two primary reflectors 138 and lamps 140 disposed in a side-by-side relationship above a secondary reflector 148 generally similar to that described in relation to the embodiment of FIGS. 1–6. The punch 142 is disposed between the two primary reflector/lamp combinations and is movable along the central axis of the secondary reflector 148 during the staking stroke. Punch 142 is a cylindrical shaft, rather than having two legs for straddling the centrally located lamp 40 in the embodiment FIGS. 1–6.

This multiple primary reflector configuration may be desirable in order to construct a staking press to meet certain space constraints, or where higher heat requirements require the use of two or more lamps. The interior surface of secondary reflector 148 may be specially designed to collect and focus the radiant energy from radiant heat sources located away from the main vertical axis of the secondary reflector. Any number of primary reflector/lamp assemblies may be disposed about the axis of punch 142, space permitting.

Figure 9:
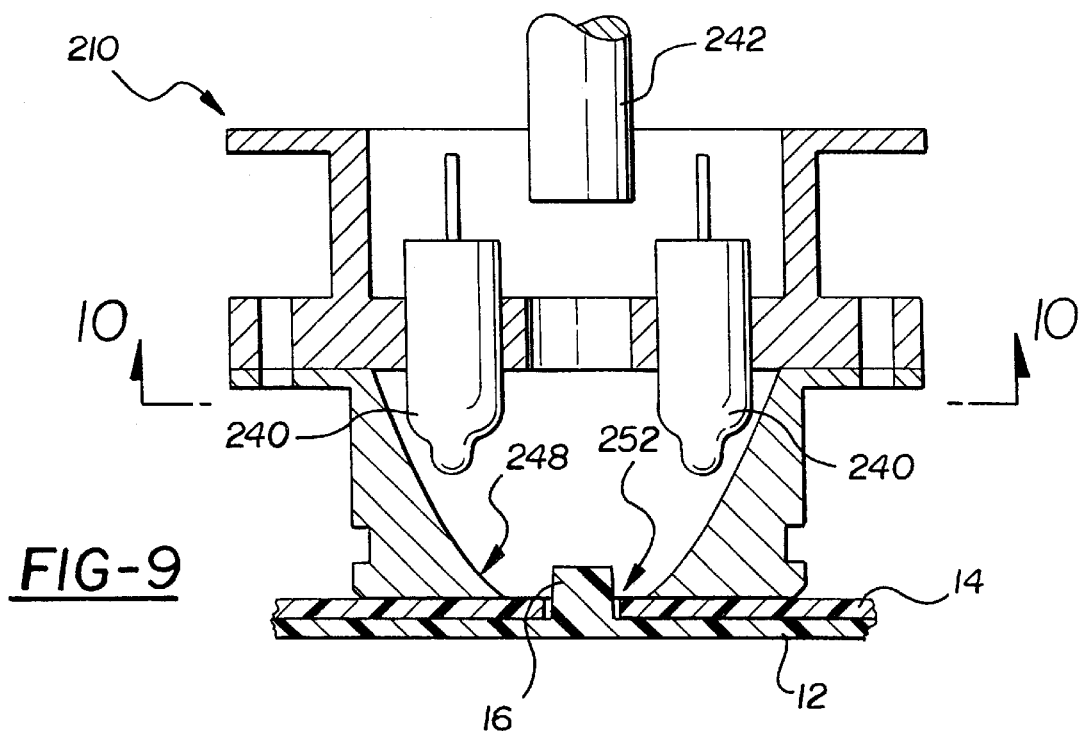
FIG. 9 is a partial side view of a heat staking head according to another embodiment of the invention.
Figure 10:
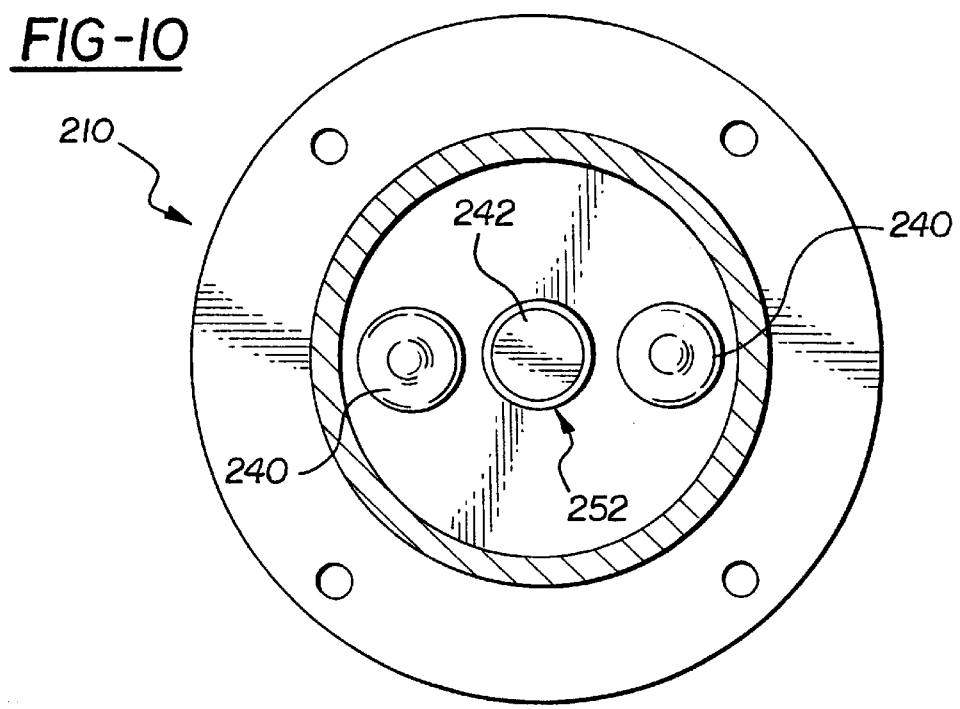
FIG. 10 is a bottom view of the heat staking head of FIG. 9.

In another embodiment of the invention shown in FIGS. 9 and 10, a heat staking head 210 has first and second lamps 240 disposed in a side-by-side relationship within the concave interior of single reflector 248. Reflector 248 has a central aperture 252 for receiving workpiece stud 16, just as in the previously described embodiments, and a significant portion of the output from lamps 240 is captured and focused onto the stud by the single reflector without the need for primary reflectors to initially direct their output downwardly. As in the embodiment of FIGS. 7 and 8, punch 242 passes between the lamps 240 during the staking stroke. Any number of lamp 240 may be used in this embodiment and spaced around the central axis of reflector 248 and punch 242.

In another embodiment of the invention depicted in FIGS. 11–13, a heat staking head 310 has a primary reflector 338, a radiant energy source 340 disposed within the primary reflector, and a secondary reflector 348 disposed below the primary reflector 338 to collect and focus energy from the source onto a stud 16. A punch head 342a is disposed on an arm 343 pivotingly mounted on the reflector assembly. An air cylinder 328 is connected to the reflector assembly and has a vertically oriented drive piston 328a which is connected to the arm 343. During the heating cycle of the staking operation, staking head 310 is in a lowered position relative to the workpieces 12,14 and air cylinder drive piston 328a is retracted to rotate arm 343 and punch 42 to a raised position wherein it is pivoted counterclockwise and upwardly as shown in FIG. 11. After the stud 16 has been heated for a sufficient length of the time to soften it, the entire heat staking head 310 is raised upwardly with respect to the workpieces. See FIG. 12. Air cylinder piston 328a is then extended to pivot arm 343 in a clockwise direction until punch head 342a is located directly below the secondary reflector 348, blocking its central aperture 352. See FIG. 13. Heat staking head 310 is then moved downwardly to urge punch head 342a against the stud 16 and deform it, as seen in FIG. 13.

The use of a heat lamp in a staking machine according to the present invention provides a heat source with nearly instant on/off control, thereby providing precise temperature control. The radiant heat source heats only the stud, thus achieving an overall efficiency of approximately 80%. Commercially available infrared lamps are relatively inexpensive and have lives on the order of 2000 hours, contributing further to the economic advantage of the invention over the prior art.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An infrared heat staking head mountable on a heat staking machine:
    a radiant heat source for generating radiant energy;
    a primary reflector positioned relative to the radiant heat source to direct a substantial portion of the radiant energy toward a workpiece;
    a secondary reflector having an aperture for receiving a portion of the workpiece therethrough, the second reflector positioned relative to the primary reflector to collect a substantial portion of the radiant energy directed by the primary reflector and focus said collected energy onto the portion of the workpiece projecting through the aperture; and
    a punch reciprocally movable with respect to the primary reflector along a punch movement axis aligned with the aperture to impact the portion of the workpiece projecting through the aperture.

2. An infrared heat staking head according to claim 1 further comprising means for urging the punch into contact with the workpiece.

3. An infrared heat staking head according to claim 1 wherein the means for urging the punch into contact with the workpiece comprises a pneumatic cylinder.

4. An infrared heat staking head according to claim 1 wherein the primary reflector is generally parabolic and is coaxially aligned with the punch movement axis.

5. An infrared heat staking head according to claim 4 wherein the radiant heat source is disposed on the punch movement axis.

6. An infrared heat staking head according to claim 1 wherein the punch is retained in sliding engagement with the primary reflector for said reciprocal movement.

7. An infrared heat staking head according to claim 1 wherein the punch is movable along an axis passing through the radiant heat source and the secondary reflector aperture, the punch comprising a head located between the source and the workpiece for impacting the workpiece.

8. An infrared heat staking head according to claim 7 wherein the punch further comprises at least one slide shaft extending rearwardly from the head and passing through the primary reflector.

9. An infrared heat staking head according to claim 1 further comprising:
    a second radiant heat source for generating radiant energy;
    a second primary reflector positioned relative to the second radiant heat source to direct a substantial portion of its radiant energy toward the secondary reflector.

10. An infrared heat staking head according to claim 9 wherein the first and second primary reflectors are disposed in spaced relationship to the punch movement axis.

11. An infrared heat staking head mountable on a heat staking machine:
    a radiant heat source lamp for generating radiant energy in the infrared range;
    a generally parabolic primary reflector positioned in surrounding relationship to the radiant heat source to direct a substantial portion of the radiant energy along an axis toward a workpiece;
    a generally parabolic secondary reflector positioned relative to the primary reflector to collect a substantial portion of the radiant energy directed by the primary reflector and focus said collected energy onto the workpiece; and
    a punch slidably engaged with the primary reflector for reciprocal movement along the axis to impact and deform the workpiece.

* * * * *